US007779343B2

(12) United States Patent
Rivers-Moore et al.

(10) Patent No.: US 7,779,343 B2
(45) Date of Patent: Aug. 17, 2010

(54) OPENING NETWORK-ENABLED ELECTRONIC DOCUMENTS

(75) Inventors: Jonathan E. Rivers-Moore, Bellevue, WA (US); Danny van Velzen, Redmond, WA (US); Prachi Bora, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1032 days.

(21) Appl. No.: 11/275,821

(22) Filed: Jan. 30, 2006

(65) Prior Publication Data

US 2007/0180354 A1      Aug. 2, 2007

(51) Int. Cl.
*G06F 17/00* (2006.01)
*G06F 7/00* (2006.01)
*G06F 13/00* (2006.01)

(52) U.S. Cl. .................. 715/205; 715/231; 715/234; 715/255; 715/273; 715/762; 707/716; 707/759; 707/E17.029; 717/111; 717/162; 717/173; 709/203; 709/219; 719/331

(58) Field of Classification Search .............. 715/200, 715/201, 202, 205, 207, 208, 209, 210, 226, 715/229, 231, 234, 251, 255, 256, 271, 273, 715/274, 700, 752, 760, 762, FOR. 209, FOR. 210, 715/FOR. 211, FOR. 221, FOR. 223, FOR. 225, 715/FOR. 226, FOR. 236, FOR. 237, FOR. 239, 715/FOR. 240, FOR. 241; 717/111, 121, 717/162, 163, 170, 171, 173, 174, 176, 178; 719/331, 332, FOR. 172, FOR. 173; 709/201–203, 709/217–219, 229; 707/705, 706, 707, 708, 707/713, 716, 759, 763, 769.9, 912, 920, 707/E17.017, E17.029, E17.03, E17.032, 707/E17.061, E17.069, E17.119, E17.129
See application file for complete search history.

(56) References Cited

U.S. PATENT DOCUMENTS 4,514,800 A     4/1985   Gruner et al.

(Continued)

FOREIGN PATENT DOCUMENTS

EP        0841615 A2    11/1999

(Continued)

OTHER PUBLICATIONS

C. Symbroski, "Updating Software and Configuration Data in a Distributed Communication Network", Hughes Network Systems, Inc., IEEE 1998, pp. 331-338.*

(Continued)

*Primary Examiner*—Laurie Ries
*Assistant Examiner*—Maikhanh Nguyen
(74) *Attorney, Agent, or Firm*—Shook Hardy Bacon LLP (57) ABSTRACT

System(s), method(s), and/or technique(s) ("tools") are described that enable a user to open a network-enabled electronic document in either a specific software application associated with the electronic document or a network browser. In some cases the tools do so using a single link. On selection of the link, if the user's computing device has access to the specific software application, the tools may load the electronic document using that application. Or, if the user's computing device does not have access to the specific software application, the tools may render the electronic document with a network browser. In so doing, the tools may make the document available to a larger set of potential users through their browsers, allow users the convenience of accessing the document within a browser, optimize users' experience in working with the document through a specific software application, or provide a simpler opening procedure.

11 Claims, 5 Drawing Sheets

U.S. PATENT DOCUMENTS

| | | | |
|---|---|---|---|
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,933,880 A | 6/1990 | Borgendale et al. | |
| 4,962,475 A | 10/1990 | Hernandez et al. | |
| 5,072,412 A | 12/1991 | Henderson, Jr. et al. | |
| 5,179,703 A | 1/1993 | Evans | |
| 5,182,709 A | 1/1993 | Makus | |
| 5,187,786 A | 2/1993 | Densmore et al. | |
| 5,191,645 A | 3/1993 | Carlucci et al. | |
| 5,195,183 A | 3/1993 | Miller et al. | |
| 5,204,947 A | 4/1993 | Bernstein et al. | |
| 5,206,951 A | 4/1993 | Khoyi et al. | |
| 5,218,672 A | 6/1993 | Morgan et al. | |
| 5,237,680 A | 8/1993 | Adams et al. | |
| 5,249,275 A | 9/1993 | Srivastava | |
| 5,274,803 A | 12/1993 | Dubin et al. | |
| 5,297,249 A | 3/1994 | Bernstein et al. | |
| 5,297,283 A | 3/1994 | Kelly, Jr. et al. | |
| 5,313,631 A | 5/1994 | Kao | |
| 5,313,646 A | 5/1994 | Hendricks et al. | |
| 5,317,686 A | 5/1994 | Salas et al. | |
| 5,333,317 A | 7/1994 | Dann | |
| 5,339,423 A | 8/1994 | Beitel et al. | |
| 5,339,424 A | 8/1994 | Fushimi | |
| 5,341,478 A | 8/1994 | Travis, Jr. et al. | |
| 5,369,766 A | 11/1994 | Nakano et al. | |
| 5,369,778 A | 11/1994 | San Soucie et al. | |
| 5,371,675 A | 12/1994 | Greif et al. | |
| 5,377,323 A | 12/1994 | Vasudevan | |
| 5,381,547 A | 1/1995 | Flug et al. | |
| 5,390,325 A | 2/1995 | Miller | |
| 5,396,623 A | 3/1995 | McCall et al. | |
| 5,408,665 A | 4/1995 | Fitzgerald | |
| 5,410,688 A | 4/1995 | Williams et al. | |
| 5,412,772 A | 5/1995 | Monson | |
| 5,434,975 A | 7/1995 | Allen | |
| 5,436,637 A | 7/1995 | Gayraud et al. | |
| 5,440,744 A | 8/1995 | Jacobson et al. | |
| 5,446,842 A | 8/1995 | Schaeffer et al. | |
| 5,459,865 A | 10/1995 | Heninger et al. | |
| 5,481,722 A | 1/1996 | Skinner | |
| 5,504,898 A | 4/1996 | Klein | |
| 5,517,655 A | 5/1996 | Collins et al. | |
| 5,535,389 A | 7/1996 | Elder et al. | |
| 5,542,070 A | 7/1996 | LeBlanc et al. | |
| 5,550,976 A | 8/1996 | Henderson et al. | |
| 5,551,035 A | 8/1996 | Arnold et al. | |
| 5,572,643 A | 11/1996 | Judson | |
| 5,572,648 A | 11/1996 | Bibayan | |
| 5,577,252 A | 11/1996 | Nelson et al. | |
| 5,581,686 A | 12/1996 | Koppolu et al. | |
| 5,581,760 A | 12/1996 | Atkinson et al. | |
| 5,602,996 A | 2/1997 | Powers, III et al. | |
| 5,608,720 A | 3/1997 | Biegel et al. | |
| 5,627,979 A | 5/1997 | Chang et al. | |
| 5,630,126 A | 5/1997 | Redpath | |
| 5,634,121 A | 5/1997 | Tracz et al. | |
| 5,640,544 A | 6/1997 | Onodera et al. | |
| 5,659,729 A | 8/1997 | Nielsen | |
| 5,664,178 A | 9/1997 | Sinofsky | |
| 5,669,005 A | 9/1997 | Curbow et al. | |
| 5,682,536 A | 10/1997 | Atkinson et al. | |
| 5,689,703 A | 11/1997 | Atkinson et al. | |
| 5,706,501 A | 1/1998 | Horikiri et al. | |
| 5,717,939 A | 2/1998 | Bricklin et al. | |
| 5,721,824 A | 2/1998 | Taylor | |
| 5,740,439 A | 4/1998 | Atkinson et al. | |
| 5,742,504 A | 4/1998 | Meyer et al. | |
| 5,745,683 A | 4/1998 | Lee et al. | |
| 5,751,956 A * | 5/1998 | Kirsch | 709/203 |
| 5,758,184 A | 5/1998 | Lucovsky et al. | |
| 5,758,358 A | 5/1998 | Ebbo | |
| 5,761,408 A | 6/1998 | Kolawa et al. | |
| 5,761,683 A | 6/1998 | Logan et al. | |
| 5,764,984 A | 6/1998 | Loucks | |
| 5,764,985 A | 6/1998 | Smale | |
| 5,778,372 A | 7/1998 | Cordell et al. | |
| 5,784,555 A | 7/1998 | Stone | |
| 5,798,757 A | 8/1998 | Smith | |
| 5,801,701 A | 9/1998 | Koppolu et al. | |
| 5,802,304 A | 9/1998 | Stone | |
| 5,806,079 A | 9/1998 | Rivette et al. | |
| 5,815,830 A | 9/1998 | Anthony | |
| 5,826,265 A | 10/1998 | Van Huben et al. | |
| 5,835,777 A | 11/1998 | Staelin | |
| 5,838,906 A | 11/1998 | Doyle et al. | |
| 5,842,018 A | 11/1998 | Atkinson et al. | |
| 5,845,077 A | 12/1998 | Fawcett | |
| 5,845,090 A | 12/1998 | Collins, III et al. | |
| 5,854,630 A | 12/1998 | Nielsen | |
| 5,859,973 A | 1/1999 | Carpenter et al. | |
| 5,862,372 A | 1/1999 | Morris et al. | |
| 5,864,819 A | 1/1999 | De Armas et al. | |
| 5,890,171 A * | 3/1999 | Blumer et al. | 715/229 |
| 5,907,704 A | 5/1999 | Gudmundson et al. | |
| 5,911,776 A | 6/1999 | Guck | |
| 5,915,112 A | 6/1999 | Boutcher | |
| 5,922,072 A | 7/1999 | Hutchinson et al. | |
| 5,929,858 A | 7/1999 | Shibata et al. | |
| 5,940,075 A | 8/1999 | Mutschler, III et al. | |
| 5,950,010 A | 9/1999 | Hesse et al. | |
| 5,956,481 A | 9/1999 | Walsh et al. | |
| 5,960,199 A | 9/1999 | Brodsky et al. | |
| 5,963,964 A | 10/1999 | Nielsen | |
| 5,982,370 A | 11/1999 | Kamper | |
| 5,987,480 A | 11/1999 | Donohue et al. | |
| 5,991,710 A | 11/1999 | Papineni | |
| 5,995,103 A | 11/1999 | Ashe | |
| 5,999,740 A | 12/1999 | Rowley | |
| 6,014,135 A | 1/2000 | Fernandes | |
| 6,016,520 A | 1/2000 | Facq et al. | |
| 6,018,743 A | 1/2000 | Xu | |
| 6,026,379 A | 2/2000 | Haller et al. | |
| 6,026,416 A | 2/2000 | Kanerva et al. | |
| 6,031,989 A | 2/2000 | Cordell | |
| 6,035,297 A | 3/2000 | Van Huben et al. | |
| 6,035,309 A | 3/2000 | Dauerer et al. | |
| 6,044,205 A | 3/2000 | Reed et al. | |
| 6,052,710 A | 4/2000 | Saliba et al. | |
| 6,054,987 A | 4/2000 | Richardson | |
| 6,067,558 A * | 5/2000 | Wendt et al. | 709/202 |
| 6,072,870 A | 6/2000 | Nguyen et al. | |
| 6,078,326 A | 6/2000 | Kilmer et al. | |
| 6,078,327 A | 6/2000 | Liman et al. | |
| 6,078,924 A | 6/2000 | Ainsbury et al. | |
| 6,081,610 A | 6/2000 | Dwork et al. | |
| 6,084,585 A | 7/2000 | Kraft et al. | |
| 6,088,708 A | 7/2000 | Burch et al. | |
| 6,091,417 A | 7/2000 | Lefkowitz | |
| 6,094,657 A | 7/2000 | Hailpern et al. | |
| 6,098,081 A | 8/2000 | Heidorn et al. | |
| 6,108,637 A | 8/2000 | Blumenau | |
| 6,108,783 A | 8/2000 | Krawczyk et al. | |
| 6,122,647 A | 9/2000 | Horowitz | |
| 6,144,969 A | 11/2000 | Inokuchi et al. | |
| 6,151,624 A | 11/2000 | Teare et al. | |
| 6,154,128 A | 11/2000 | Wookey et al. | |
| 6,163,772 A | 12/2000 | Kramer et al. | |
| 6,167,521 A | 12/2000 | Smith et al. | |

| Patent Number | Kind | Date | Inventor(s) |
|---|---|---|---|
| 6,167,523 | A | 12/2000 | Strong |
| 6,192,367 | B1 | 2/2001 | Hawley et al. |
| 6,195,661 | B1 | 2/2001 | Filepp et al. |
| 6,199,204 | B1 | 3/2001 | Donohue |
| 6,209,128 | B1 | 3/2001 | Gerard et al. |
| 6,216,152 | B1 | 4/2001 | Wong et al. |
| 6,219,698 | B1 | 4/2001 | Iannucci et al. |
| 6,225,996 | B1 | 5/2001 | Gibb et al. |
| 6,235,027 | B1 | 5/2001 | Herzon |
| 6,253,366 | B1 | 6/2001 | Mutschler, III |
| 6,253,374 | B1 | 6/2001 | Dresevic et al. |
| 6,263,313 | B1 | 7/2001 | Milsted et al. |
| 6,266,810 | B1 | 7/2001 | Tanaka et al. |
| 6,275,227 | B1 | 8/2001 | DeStefano |
| 6,275,599 | B1 | 8/2001 | Adler et al. |
| 6,281,896 | B1 | 8/2001 | Alimpich et al. |
| 6,282,711 | B1 | 8/2001 | Halpern et al. |
| 6,286,033 | B1 | 9/2001 | Kishinsky et al. |
| 6,292,897 | B1 | 9/2001 | Gennaro et al. |
| 6,297,819 | B1 | 10/2001 | Furst |
| 6,308,179 | B1 | 10/2001 | Petersen et al. |
| 6,311,271 | B1 | 10/2001 | Gennaro et al. |
| 6,314,565 | B1 * | 11/2001 | Kenner et al. ............... 717/171 |
| 6,321,259 | B1 | 11/2001 | Ouellette et al. |
| 6,321,334 | B1 | 11/2001 | Jerger et al. |
| 6,327,628 | B1 | 12/2001 | Anuff et al. |
| 6,331,864 | B1 | 12/2001 | Coco et al. |
| 6,342,907 | B1 | 1/2002 | Petty et al. |
| 6,343,302 | B1 | 1/2002 | Graham |
| 6,345,256 | B1 | 2/2002 | Milsted et al. |
| 6,345,361 | B1 | 2/2002 | Jerger et al. |
| 6,347,323 | B1 | 2/2002 | Garber et al. |
| 6,349,408 | B1 | 2/2002 | Smith |
| 6,353,926 | B1 | 3/2002 | Parthesarathy et al. |
| 6,356,906 | B1 | 3/2002 | Lippert et al. |
| 6,357,038 | B1 | 3/2002 | Scouten |
| 6,366,907 | B1 | 4/2002 | Fanning et al. |
| 6,366,912 | B1 | 4/2002 | Wallent et al. |
| 6,369,840 | B1 | 4/2002 | Barnett et al. |
| 6,369,841 | B1 | 4/2002 | Salomon et al. |
| 6,374,402 | B1 | 4/2002 | Schmeidler et al. |
| 6,381,742 | B2 | 4/2002 | Forbes et al. |
| 6,381,743 | B1 | 4/2002 | Mutschler, III |
| 6,389,434 | B1 | 5/2002 | Rivette |
| 6,393,456 | B1 | 5/2002 | Ambler et al. |
| 6,396,488 | B1 | 5/2002 | Simmons et al. |
| 6,408,311 | B1 | 6/2002 | Baisley et al. |
| 6,415,335 | B1 * | 7/2002 | Lowery et al. ................. 710/5 |
| 6,421,070 | B1 | 7/2002 | Ramos et al. |
| 6,421,656 | B1 | 7/2002 | Cheng et al. |
| 6,425,125 | B1 | 7/2002 | Fries et al. |
| 6,429,885 | B1 | 8/2002 | Saib et al. |
| 6,434,563 | B1 | 8/2002 | Pasquali et al. |
| 6,434,564 | B2 | 8/2002 | Ebert |
| 6,442,563 | B1 | 8/2002 | Bacon et al. |
| 6,442,755 | B1 | 8/2002 | Lemmons et al. |
| 6,446,110 | B1 | 9/2002 | Lection et al. |
| 6,449,617 | B1 | 9/2002 | Quinn et al. |
| 6,460,058 | B2 | 10/2002 | Koppulu |
| 6,470,349 | B1 | 10/2002 | Heninger |
| 6,473,800 | B1 | 10/2002 | Jerger et al. |
| 6,476,828 | B1 | 11/2002 | Burkett et al. |
| 6,476,833 | B1 | 11/2002 | Moshfeghi |
| 6,477,544 | B1 | 11/2002 | Bolosky |
| 6,480,860 | B1 | 11/2002 | Monday |
| 6,487,566 | B1 | 11/2002 | Sundaresan |
| 6,493,702 | B1 | 12/2002 | Adar et al. |
| 6,502,101 | B1 | 12/2002 | Verprauskus et al. |
| 6,502,103 | B1 | 12/2002 | Frey et al. |
| 6,505,230 | B1 | 1/2003 | Mohan et al. |
| 6,505,300 | B2 | 1/2003 | Chan et al. |
| 6,507,856 | B1 | 1/2003 | Chen et al. |
| 6,516,322 | B1 | 2/2003 | Meredith |
| 6,519,617 | B1 | 2/2003 | Wanderski et al. |
| RE38,070 | E | 4/2003 | Spies et al. |
| 6,546,546 | B1 | 4/2003 | Van Doorn |
| 6,549,221 | B1 | 4/2003 | Brown et al. |
| 6,549,878 | B1 | 4/2003 | Lowry et al. |
| 6,549,922 | B1 | 4/2003 | Srivastava et al. |
| 6,553,402 | B1 | 4/2003 | Makarios et al. |
| 6,560,620 | B1 | 5/2003 | Ching |
| 6,560,640 | B2 | 5/2003 | Smethers |
| 6,563,514 | B1 | 5/2003 | Samar |
| 6,571,253 | B1 | 5/2003 | Thompson et al. |
| 6,578,144 | B1 | 6/2003 | Gennaro et al. |
| 6,581,061 | B2 | 6/2003 | Graham |
| 6,584,548 | B1 | 6/2003 | Bourne et al. |
| 6,585,778 | B1 | 7/2003 | Hind et al. |
| 6,598,219 | B1 | 7/2003 | Lau |
| 6,604,099 | B1 | 8/2003 | Chung et al. |
| 6,606,606 | B2 | 8/2003 | Starr |
| 6,609,200 | B2 | 8/2003 | Anderson et al. |
| 6,611,822 | B1 | 8/2003 | Beams et al. |
| 6,611,840 | B1 | 8/2003 | Baer et al. |
| 6,613,098 | B1 | 9/2003 | Sorge et al. |
| 6,615,276 | B1 | 9/2003 | Mastrianni et al. |
| 6,629,109 | B1 | 9/2003 | Koshisaka |
| 6,631,357 | B1 | 10/2003 | Perkowski |
| 6,631,379 | B2 | 10/2003 | Cox |
| 6,631,497 | B1 | 10/2003 | Jamshidi et al. |
| 6,631,519 | B1 | 10/2003 | Nicholson et al. |
| 6,635,089 | B1 | 10/2003 | Burkett et al. |
| 6,636,845 | B2 | 10/2003 | Chau et al. |
| 6,643,633 | B2 | 11/2003 | Chau et al. |
| 6,643,684 | B1 | 11/2003 | Malkin et al. |
| 6,654,737 | B1 | 11/2003 | Nunez |
| 6,658,417 | B1 | 12/2003 | Stakutis et al. |
| 6,658,622 | B1 | 12/2003 | Aiken et al. |
| 6,668,369 | B1 | 12/2003 | Krebs et al. |
| 6,678,717 | B1 | 1/2004 | Schneider |
| 6,691,230 | B1 | 2/2004 | Bardon |
| 6,691,281 | B1 | 2/2004 | Sorge et al. |
| 6,697,944 | B1 | 2/2004 | Jones et al. |
| 6,701,434 | B1 | 3/2004 | Rohatgi |
| 6,711,679 | B1 | 3/2004 | Guski et al. |
| 6,725,426 | B1 | 4/2004 | Pavlov |
| 6,735,721 | B1 | 5/2004 | Morrow et al. |
| 6,748,385 | B1 | 6/2004 | Rodkin |
| 6,751,777 | B2 | 6/2004 | Bates |
| 6,760,723 | B2 | 7/2004 | Oshinsky et al. |
| 6,763,496 | B1 * | 7/2004 | Hennings et al. ............ 715/205 |
| 6,772,139 | B1 | 8/2004 | Smith, III |
| 6,772,165 | B2 | 8/2004 | O'Carroll |
| 6,774,926 | B1 | 8/2004 | Ellis et al. |
| 6,779,154 | B1 | 8/2004 | Nussbaum et al. |
| 6,799,299 | B1 | 9/2004 | Li et al. |
| 6,816,849 | B1 | 11/2004 | Halt, Jr. |
| 6,845,380 | B2 | 1/2005 | Su et al. |
| 6,845,499 | B2 | 1/2005 | Srivastava et al. |
| 6,848,078 | B1 | 1/2005 | Birsan et al. |
| 6,871,220 | B1 | 3/2005 | Rajan et al. |
| 6,874,130 | B1 | 3/2005 | Baweja, et al. |
| 6,876,996 | B2 | 4/2005 | Czajkowski et al. |
| 6,889,359 | B1 | 5/2005 | Conner et al. |
| 6,901,403 | B1 | 5/2005 | Bata et al. |
| 6,931,532 | B1 | 8/2005 | Davis et al. |
| 6,941,510 | B1 | 9/2005 | Ozzie et al. |
| 6,948,133 | B1 | 9/2005 | Haley |
| 6,948,135 | B1 | 9/2005 | Ruthfield et al. |
| 6,963,875 | B2 | 11/2005 | Moore et al. |
| 6,968,503 | B1 | 11/2005 | Chang et al. |
| 6,968,505 | B2 | 11/2005 | Stoll et al. |
| 6,993,714 | B2 | 1/2006 | Kaler et al. |
| 6,996,776 | B1 | 2/2006 | Makely et al. |
| 6,996,781 | B1 | 2/2006 | Myers et al. |
| 7,003,719 | B1 * | 2/2006 | Rosenoff et al. ............ 715/205 |

| | | |
|---|---|---|
| 7,003,722 B2 | 2/2006 | Rothchiller et al. |
| 7,028,268 B1 * | 4/2006 | Conley, Jr. ............... 715/841 |
| 7,036,072 B1 | 4/2006 | Sulistio et al. |
| 7,039,875 B2 | 5/2006 | Khalfay et al. |
| 7,062,764 B2 | 6/2006 | Cohen et al. |
| 7,086,009 B2 | 8/2006 | Resnick et al. |
| 7,107,282 B1 | 9/2006 | Yalamanchi |
| 7,114,128 B2 * | 9/2006 | Koppolu et al. ............ 715/781 |
| 7,203,937 B1 * | 4/2007 | Kyle et al. ................ 717/168 |
| 7,346,703 B2 * | 3/2008 | Cope ........................ 709/238 |
| 2001/0022592 A1 | 9/2001 | Alimpich et al. |
| 2001/0024195 A1 | 9/2001 | Hayakawa |
| 2001/0037345 A1 | 11/2001 | Kiernan et al. |
| 2001/0054004 A1 | 12/2001 | Powers |
| 2001/0056429 A1 | 12/2001 | Moore et al. |
| 2001/0056460 A1 | 12/2001 | Sahota et al. |
| 2002/0010746 A1 | 1/2002 | Jilk, Jr. et al. |
| 2002/0026441 A1 | 2/2002 | Kutay et al. |
| 2002/0026461 A1 | 2/2002 | Kutay et al. |
| 2002/0032768 A1 | 3/2002 | Voskuil |
| 2002/0035581 A1 | 3/2002 | Reynar et al. |
| 2002/0040469 A1 | 4/2002 | Pramberger |
| 2002/0057297 A1 | 5/2002 | Grimes et al. |
| 2002/0100027 A1 | 7/2002 | Binding et al. |
| 2002/0103824 A1 * | 8/2002 | Koppolu et al. .......... 707/501.1 |
| 2002/0112224 A1 | 8/2002 | Cox |
| 2002/0133484 A1 | 9/2002 | Chau et al. |
| 2002/0152244 A1 | 10/2002 | Dean et al. |
| 2002/0156772 A1 | 10/2002 | Chau et al. |
| 2002/0156929 A1 | 10/2002 | Hekmatpour |
| 2002/0169789 A1 | 11/2002 | Kutay et al. |
| 2002/0174401 A1 | 11/2002 | Wang et al. |
| 2002/0184219 A1 | 12/2002 | Preisig et al. |
| 2002/0188597 A1 | 12/2002 | Kern et al. |
| 2002/0188613 A1 | 12/2002 | Chakraborty et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0025732 A1 | 2/2003 | Prichard |
| 2003/0037303 A1 | 2/2003 | Bodlaender et al. |
| 2003/0043986 A1 | 3/2003 | Creamer et al. |
| 2003/0046665 A1 | 3/2003 | Ilin |
| 2003/0051243 A1 | 3/2003 | Lemmons et al. |
| 2003/0055828 A1 | 3/2003 | Koch et al. |
| 2003/0056198 A1 | 3/2003 | Al-Azzawe et al. |
| 2003/0061386 A1 | 3/2003 | Brown et al. |
| 2003/0120578 A1 | 6/2003 | Newman |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0140132 A1 | 7/2003 | Champagne et al. |
| 2003/0158897 A1 | 8/2003 | Ben-Natan et al. |
| 2003/0167277 A1 | 9/2003 | Hejlsberg et al. |
| 2003/0182268 A1 | 9/2003 | Lal |
| 2003/0187930 A1 | 10/2003 | Ghaffar et al. |
| 2003/0189593 A1 | 10/2003 | Yarvin |
| 2003/0204511 A1 | 10/2003 | Brundage et al. |
| 2003/0204814 A1 | 10/2003 | Elo et al. |
| 2003/0205615 A1 | 11/2003 | Marappan |
| 2003/0212664 A1 | 11/2003 | Breining et al. |
| 2003/0225768 A1 | 12/2003 | Chaudhuri et al. |
| 2003/0225829 A1 | 12/2003 | Pena et al. |
| 2003/0226132 A1 | 12/2003 | Tondreau et al. |
| 2003/0233374 A1 | 12/2003 | Spinola et al. |
| 2003/0237046 A1 | 12/2003 | Parker et al. |
| 2003/0237047 A1 | 12/2003 | Borson |
| 2004/0002939 A1 | 1/2004 | Arora et al. |
| 2004/0003031 A1 | 1/2004 | Brown et al. |
| 2004/0010752 A1 | 1/2004 | Chan et al. |
| 2004/0024842 A1 | 2/2004 | Witt |
| 2004/0044961 A1 | 3/2004 | Pesenson |
| 2004/0059754 A1 | 3/2004 | Barghout et al. |
| 2004/0073565 A1 | 4/2004 | Kaufman et al. |
| 2004/0093596 A1 | 5/2004 | Koyano |
| 2004/0117769 A1 | 6/2004 | Lauzon et al. |
| 2004/0123277 A1 | 6/2004 | Schrader et al. |
| 2004/0146199 A1 | 7/2004 | Berkner et al. |
| 2004/0163041 A1 | 8/2004 | Engel |
| 2004/0186762 A1 | 9/2004 | Beaven et al. |
| 2004/0187076 A1 * | 9/2004 | Ki et al. ...................... 715/513 |
| 2004/0205473 A1 | 10/2004 | Fisher et al. |
| 2004/0205571 A1 | 10/2004 | Adler et al. |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0221245 A1 | 11/2004 | Chickles et al. |
| 2005/0004893 A1 | 1/2005 | Sangroniz |
| 2005/0005248 A1 | 1/2005 | Rockey et al. |
| 2005/0015732 A1 | 1/2005 | Vedula et al. |
| 2005/0027757 A1 | 2/2005 | Kiessig et al. |
| 2005/0076049 A1 | 4/2005 | Qubti et al. |
| 2005/0102370 A1 | 5/2005 | Lin et al. |
| 2005/0171746 A1 | 8/2005 | Thalhammer-Reyero |
| 2005/0198086 A1 | 9/2005 | Moore et al. |
| 2005/0223320 A1 | 10/2005 | Brintzenhofe et al. |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0085409 A1 | 4/2006 | Rys et al. |

FOREIGN PATENT DOCUMENTS

| | | |
|---|---|---|
| EP | 0961197 | 12/1999 |
| EP | 1076290 A2 | 2/2001 |
| JP | 63085960 | 4/1988 |
| JP | 401173140 A | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 3191429 | 1/2000 |
| JP | 2000132436 | 5/2000 |
| JP | 2002183652 | 6/2002 |
| JP | 2003173288 | 6/2003 |
| WO | WO99/24945 | 5/1999 |
| WO | WO99/56207 | 11/1999 |
| WO | WO01/44934 A1 | 6/2001 |
| WO | WO0157720 | 8/2001 |

OTHER PUBLICATIONS

M. Segal et al., "Dynamic Program Updating In A Distributed Computer System", Dept. of Electronic Engineering & Computer Science, Michigan Uninversity, IEEE, 1998, pp. 198-203.*

Baraband et al., PowerForms: "Declarative Client Site Form Field Validation", World Wide Web, Baltzer Science Publishers, Bussum, NL. vol. 3, No. 4, Dec. 2000, p. 1-20.

"A tour of Xmetal" O'Reilly XML.COM 'Online Jul. 14, 1999 XP002230081 retrieved from the internet [URL:http://www.xml.com/pub/a/SeyboldReport/ip0311025.html] retrieved on Feb. 5, 2003.

Atova, "User Reference manual Version 4.4, XML Spy suite 4.4," Atova Ges.m.b.H and Altova, Inc., May 24, 2002, pages cover, copyright p. 1-565.

Altova, Inc., "XML Spy 4.0 Manual," Altova Inc. & Altova GmbH, coyright 1998-2001, Chapters 1, 2, and 6, encompassing pp. 1-17, 18-90, and 343-362.

Altova et al. XML Spy, XML integrated Development Environments, Altova Inc., 2002 pp. 1-18.

"Architecture for a Dynamic Information Area Control" IBM Technical Disclosure Bulletin IBM Corp. New York US vol. 37 No. 10 Jan. 10, 1994. pp. 245-246.
"Netscape Communicator's Collapsible Toolbars" CHI'98 Human Factors In Computing Systems Conference Proceedings Los Angeles CA Apr. 18-23, 1998 pp. 81-86.
Barker et al., "Creating In-Line Objects Within An Integrated Editing Environment," IBM Technical Disclosure Bulletin, vol. 27, No. 5, Oct. 1984, p. 2962.
"Flexible Information Presentation with XML" 1998 The Institution of Electrical Engineers 6 pages.
Ben-Natan, Provisional U.S Appl. No. 60/203,081, filed May 9, 2000, entitled "Internet platform for creating and supporting communities".
Berg A., "Naming and Binding: Monikers" Inside OLE, 1995, Chapter 9, pp. 431-490.
"Arbortext Adept 8 Editor Review" O'Reilly XML.COM 'Online! Sep. 22, 1999 XP002230080 retrieved from the Internet [URL:http://www.xml.com/purb/a/1999/09/adept/AdeptRvw.htm] retrieved on Feb. 5, 2003.
Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.
"XKvalidator: A Constraint Validator for XML" CIKM '-2 Nov. 4-9, 2002 Copyright 2002 ACM 1-58113-492-4/02/0011 pp. 446-452.
"Designing Valid XML Views" ER 2002 LNCS 2503 2002 Springer-Verlag Berlin Heidelberg 2002 pp. 463-477.
Efficient Management of Multiversion Documents by Object Referencing Proceedings of the 27th VLDB Conference 2001 pp. 291-300.
"Efficient schemes for managing mulitversion XML documents" VLDB Journal (2002) pp. 332-352.
"Storing and Querying Multiversion XML Documents using Durable Node Numbers" IEEE 2002 pp. 232-241.
"XML Document Versioning" SIGMOD Record vol. 30 No. 3 Sep. 2001 pp. 46-53.
"Generic Validation of Structural Content with Parametric Modules" ICFP '01 Sep. 3-5, 2001 Copyright 2001 ACM 1-58113-415-0/01/0009 pp. 98-109.
"Managing Complex Documents Over the WWW: A Case Study for XML" IEEE Transactions on Knowledge and Data Engineering vol. 11 No. 4 Jul./Aug. 1999. pp. 629-938.
Clapp D., "The NeXT Application Kit Part I: Non-Responsive Classes," The NeXT Bible 1990, Chapter 16, pp. 275-293.
Clark James—W3C Editor; "XSL Transformation (XSLT) Verison 1.0" Nov. 16, 1999 W3C (MIT INRIA Kejo) pp. 1-156.
W3C Editor James Clark and Ste; "XML Path Language (XPath) Version 1.0" Nov. 16, 1999 W3C (MIT INRIA Kejo) pp. 1-49.
"From small beginnings" Knowledge Management Nov. 2001 pp. 28-30.
Cybook, Inc.: "Copying the Search Form to Services-based Web Sites" INternet Article, (online) Jul. 26, 2004.*the whole document*.
"XML Editors: Allegations of Functionality in search of reality" Internet 'Online! 1999 XP002230082 retrieved from the Internet [URL:http://www.ivritype.com/xml/].
"Photo Shop 5/5.5 WOW! Book" 2000 Peachpit Press pp. 8-17.
Description of Whitehill Composer software product producted by Whitehill Technologies Inc. available at [http://www.xml.com/pub/p/221] accessed on Apr. 8, 2004, two pages.
DiLascia et al., "Sweeper" Microsoft Interactive Developer, vol. 1, No. 1, 1996, 27 pages.
"XML Spy Tops as XML Editor" http://www.eweek.com/article2/0395972404100.asp Nov. 25, 2002 4 pages.
Excel Developer Tip (hereinafter "Excel"), "Determining the Data Type of a Cell", May 13, 1998, p. 1 (available at http://jwalk.com/ss//excel/tips/tip62.htm).
"Agent-based Software Configuration and Deployment" Thesis of the Univeristy of Colorado Online Dec. 31, 1999 retrieved from the Internet on Nov. 7, 2003: [http://www.cs.colorado.edu/users/rickhall/documents/ThesisFinal.pdf] 169 pages.
Han et al., WebSplitter. A Unified XML Framework for Multi-Device Collaborative Web Browsing, 2000, ACM Conference on Cimputer Supported Cooperative Work, 10 pages.

"Mapping and Displaying Structural Transformations between XML and PDF" DocEng '02 Nov. 8-9, 2002 Copyright 2002 ACM 1-58113-597-7/02/0011 pp. 95-102.
"Tsbiff-tildeslash biff—version 1.2.1" Internet Document [Online] Jun. 1999 URL: http://web.archive.org/web/19990912001527/http://www.tildeslash.com/tsbiff/.
Herzner et al., "CDAM—Compound Document Access and Management. An Object-Oriented Approach" Multimedia Systems Interaction and Applications, 1992, Chapter 3, pp. 17-36.
"Micro-Firewalls for Dynamic Network Security with Distributed Intrusion Detection"; IEEE INternational Symposium on Network Computing and Applications; 2001; pp. 68-79.
IBM: Stack Algorithm for Extractin Subtree from Serialized Tree, Mar. 1, 1994, TDB-ACC-NONN94033, 3 pages.
Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.
"Specifying Runtime Environments and Functionalities of Downloadable Components Under the Sandbox Mode"; International Symposium on Principles of Software Evolution; 2000; pp. 138-142.
"An Efficiently Updatable Index Scheme for Structured Documents" 1998 IEEE pp. 991-996.
"Immediate and Partial Validation Mechanism for the Conflict Resolution of Update Operations in XML Databases" WAIM 2002 LNCS 2419 2002 pp. 387-396 Springer-Veriag Berlin Heidelberg 2002.
Kobayashi et al., "An Update on BTRON-specification OS Development" IEEE 1991, pp. 132-140.
Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.
Kutay, Provisional U.S. Appl. No. 60/209,713, filed Jun. 5, 2000, entitled, "Methods and systems for accessing, organizing presenting and viewing data".
Laura Acklen and Read Gilgen, "Using corel Wordperfect 9", 251-284, 424-434, 583-586 (1998).
LeBlond et al, "PC Magazine Guide to Quattro Pro for Windows", pp. 9-11, 42-61, Ziff-Davis Press, Copyright 1993 by the LeBlond Group.
Macromedia, Inc.: "Dreamweaver Technote, Changes in copying and pasting in Dreamweaver 4" Internet Article (online). *the whole document*.
McCright J.S.; "New Tool Kit to Link Groove with Microsoft Sharepoint" eWeek Enterprise News and Reviews Ziff Davis Media Inc. Jul. 29, 2002.
Microsoft Visual Basic 5.0 Programmer's Guide 1997; pp. 578-579;Redmond WA 98052-6399.
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, Provisional U.S. Appl. No. 60/191,662, filed Mar. 23, 2000, entitled "Collection-based presistent digital archives".
Musgrave S; "Networking technology—impact and opportunities" Survey and Statistical Computing 1996. Proceedings of the Second ASC International Conference. Sep. 1996. pp. 369-378. London UK.
"Validation with MSXML and XML Schema" Windows Developer Magazine Jan. 2002 pp. 35-38.
"SmartUpdate Developer's Guide" Online Mar. 11, 1999 retrieved from the Internet on Dec. 8, 2000: [http://developer. netscape.com:80/docs/manuals/communicator/jarman/index.htm] 83 pages.
"Netscape Communicator 4.61 for OS/2 Warp" Software 1999 The whole software release and "Netscape—Version 4.6 [en]-010615" Netscape Screenhot Oct. 2, 2002.
"A secure conditional access system using digital signature and encryption" 2003 Digest of Technical Papers. International Conference on Consumer Electronics Jun. 2003 pp. 220-221.
Object Management Group, XML Metadata Interchange (XMI) Specification Version 1.2 Jan. 2002.
"Delphi 5 Developers Guide" Sams Publishing 1999 Chapter 31 Section: Data Streaming 6 pages.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Prevelakis et al., "Sandboxing Applications"; Proceedings of the FREENIX Track; 2001; pp. 119-126.

Rado, Dave: "How to create a template that makes it easy for users to "fill in the blanks", without doing any programming" Microsoft Word MVP FAQ Site, (online) Apr. 30, 2004, the whole document.

Rapaport L; "Get more from SharePoint" Transform Magazine vol. 11 No. 3, Mar. 2002 pp. 1315.

"Validating MPEG-21 Encapsulated Functional Metadata" IEEE 2002 pp. 209-212.

Excel 97 for Busy People Published by Osborne/Mcgraw-Hill 1997 pp. 48-50.

Schmid et al., "Protecting Data from Malicious Software"; 18th Annual Computer Security Applications Conference; 2002; pp. 199-208.

Staneck W., "Internal and External Media" Electronic Publishing Unleashed, 1995, Chapter 22, pp. 510-542.

"Store and Organize Related Project Files in a Binder," Getting Results with Microsoft Office, 1990, pp. 109-112.

Sun Q. et al., "A robust and secure media signature scheme for JPEG images" Proceedings of 2002 IEEE Workshop on Multimedia Signal Processing, Dec. 2002, pp. 296-299.

"XFIG Version 3.2 Patchlevel 2 (Jul. 2, 1998) Users Manual (Edition 1.0)" Internet Document [Online] Jul. 2, 1998 XP002229137 Retrieved from the Internet: [URL:http://www.ice.mtu.edu/online_docs/xfig332/] [retrieved on Jan. 28, 2003].

"An Efficient and Flexible Access Control Framework for Java Programs in Mobile Terminals"; 22nd International Conference on Distributed Computing Systems Workshops; 2002; pp. 777-782.

Trupin J., "The Visual Programmer," Microsoft Systems Journal, Apr. 1996, pp. 103-105.

"XML: Not a Silver Bullet But a Great Pipe Wrench" Standardview vol. 6. No. 3 Sep. 1998 pp. 125-132.

"The Open Software Description Format" Online Aug. 13, 1997 retrieved from the Internet on Nov. 7, 2003: [http://www.w3.org/TR/NOTE-OSD] 11 pages.

"Bridging XML—Schema and relational databases. A System for generating and manipulating relational databases using valid XML documents." DocEng '01 Nov. 9-10, 2001 Coppyright 2001 ACM 1-58113-432-0/01/0011 pp. 105-114.

"The Component Object Model" A Technical Overview Oct. 1994 Microsoft Corp. pp. 1-14.

"Managing and Querying Multi-Version XML Data with Update Logging" DocEng '02 Nov. 8-9, 2002 Copyright 2002 ACM 1-58113-594-7/02/0011 pp. 74-81.

Zdonik S., "Object Management System Concepts," ACM, 1984, pp. 13-19.

Cover, XML Forms Architecture, retrieved at << http://xml.coverpages.org/xfa.html> on Aug. 17, 2006, Coverpages, Jun. 16, 1999.

Raggett, "HTML Tables", retrieved on Aug. 6, 2006, at <<http:www://is-edu.hcrnuns.edu.vn/WebLib/books/Web/Tel/html3-tables.html>>, W3C Internet Draft, Jul. 7, 1995, pp. 1-12.

Raggett et al., "HTML Tables", W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermedia Corporation, 2006, pp. 07.

* cited by examiner

OPENING NETWORK-ENABLED ELECTRONIC DOCUMENTS

BACKGROUND

Currently, users may open network-enabled electronic documents by selecting links. Some links cause a specific software application associated with the electronic document to load the electronic document. Some other links cause a network browser to render the electronic document.

Assume, for example, that a sales manager wants to enable his or her salesmen to be able to open an electronic document to record their sales. The sales manager may send an email to the salesmen with two links to the electronic document: one for opening the electronic document using a specific software application associated with the electronic document; and one for opening the electronic document with a network browser.

SUMMARY

System(s), method(s), and/or technique(s) ("tools") are described that enable a user to open a network-enabled electronic document in either a specific software application associated with the electronic document or a network browser. In some cases the tools do so using a single link. On selection of the link, if the user's computing device has access to the specific software application, the tools may load the electronic document using that application. Or, if the user's computing device does not have access to the specific software application, the tools may render the electronic document with a network browser. In so doing, the tools may make the document available to a larger set of potential users through their browsers, allow users the convenience of accessing the document within a browser, optimize users' experience in working with the document through a specific software application, or provide a simpler opening procedure.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Overview

The following document describes tools capable of enabling a user to open a network-enabled electronic document in either a specific software application associated with the electronic document or a network browser. The tools may decide between these options based on: whether the user's computing device has access to the specific software application or a version of that application capable of fully implementing the electronic document's functions; a pre-selected setting or default; or the user's selection, among others.

An environment in which the tools may enable these and other actions is set forth below in a section entitled Exemplary Operating Environment. This section is followed by another section describing exemplary ways in which the tools open a network-enabled electronic document responsive to the electronic document being selected with a link in a document library, entitled Selecting an Electronic Document with a Link in a Document Library. Another section follows and describes exemplary ways in which the tools open a network-enabled electronic document responsive to the electronic document being selected with other types of links, entitled Selecting an Electronic Document with a Link in a Webpage, Email, or Document. A final section, entitled Determining Where to Open Electronic Documents, sets forth an exemplary process by which the tools may determine whether to open an electronic document in a network browser or a specific software application. These section titles are provided for the reader's convenience and do not alter or limit the scope of the entitled sections.

Exemplary Operating Environment

Before describing the tools in detail, the following discussion of an exemplary operating environment is provided to assist the reader in understanding one way in which various inventive aspects of the tools may be employed. The environment described below constitutes but one example and is not intended to limit application of the tools to any one particular operating environment. Other environments may be used without departing from the spirit and scope of the claimed subject matter.

Figure 1:
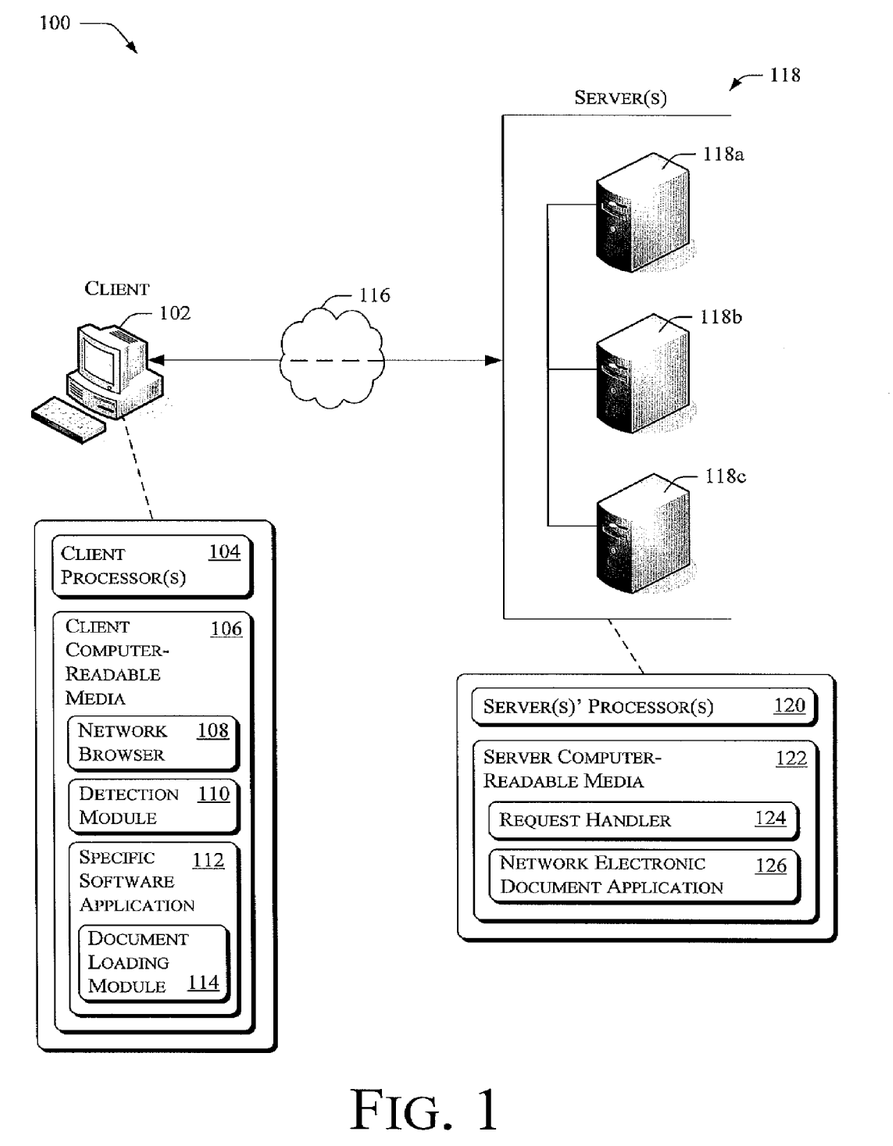
FIG. 1 illustrates an exemplary operating environment in which various embodiments of the tools may operate.

FIG. 1 illustrates one such operating environment generally at 100 comprising a client computing device 102 having one or more client processor(s) 104 and client computer-readable media 106. The client computing device is shown with a desktop computer icon but may be another type of computing device, such as a smart phone, laptop, or personal digital assistant. The client processors are capable of accessing and/or executing the computer-readable media. The client computer-readable media comprises or has access to a network browser 108, which is a module, program, or other entity capable of interacting with a network-enabled entity, a detection module 110, and a specific software application 112.

The detection module is capable of detecting whether or not the client computing device has access to the specific software application and, in some cases, the specific software application's version and capabilities. It may be part of or separate from the network browser and comprise script and/or an ActiveX module. The specific software application is capable of opening a specific type of electronic document, such as an Excel™ application that is capable of editing Excel™-type spreadsheet electronic documents or an Infopath™ application that is capable of editing Infopath™-form types of electronic documents. The specific software application may also comprise or be affected by a document loading module 114, which is capable of causing an electronic document to be loaded and opened within the specific software application.

The operating environment also comprises a network 116 and server(s) 118 ("servers"). The network enables communication between the client and the servers, and may comprise a global or local wired or wireless network, such as the Internet or a company's intranet.

The servers comprise a single server or multiple servers, such as a server farm, though the servers may also comprise additional server or non-server entities capable of communicating with other entities or of governing the individual servers. The servers are shown with three separate servers 118a, 118b, and 118c operating serially or in parallel to service requests.

The servers comprise servers' processors 120 and server computer-readable media 122. The server processors are capable of accessing and/or executing the server computer-readable media. The server computer-readable media comprises or has access to a request handler 124, and a network electronic document application 126. The request handler is capable of receiving or intercepting requests, such as requests generated responsive to a user selecting to open an electronic document. The network electronic document application is capable of servicing an electronic document, such as by creating and providing HTML ("HyperText Markup Language") enabling the network browser to render the electronic document and receiving and saving edits to the electronic document.

Selecting an Electronic Document with a Link in a Document Library

The following discussion describes exemplary ways in which the tools open a network-enabled electronic document in either a specific software application associated with the electronic document or a network browser responsive to the electronic document being selected with a link in a document library. A document library may comprise, for example, a web page containing a collection of electronic documents and a way in which to select a link to each of these documents. This discussion refers to particular elements, such as elements of operating environment 100 of FIG. 1, though other elements and environments may be used.

When a user selects a link, such as a hyperlink in a document library to open an electronic document, the tools determine whether or not a specific software application associated with the electronic document is available on or accessible by the user's computing device (e.g., it is installed). The tools also determine whether or not the specific software application is of a version compatible with the electronic document. If both of these are true, the tools may load the electronic document on the user's computing device with the specific software application. In some cases there is an indication (e.g., a previously selected setting) indicating that the electronic document should only be opened in the network browser. In these cases the tools may forgo these actions and immediately open the electronic document in the network browser.

If the specific software application associated with the electronic document is not accessible or is accessible but of an incompatible version, the tools may also open the electronic document with the user's network browser. To do so, the tools may, in some cases, cause the network browser to navigate to a page with appropriate query parameters sufficient to cause the browser to open the electronic document on that page.

The tools may behave in either of these manners regardless of whether the user is selecting to create a new electronic document or is selecting an existing electronic document. Also, when the user is done with the electronic document, the tools may return the user to the page that was used to open the document (e.g., the document library page or other page through which the link was selected). An exemplary process performing some of the above actions is set forth immediately below.

Figure 2:
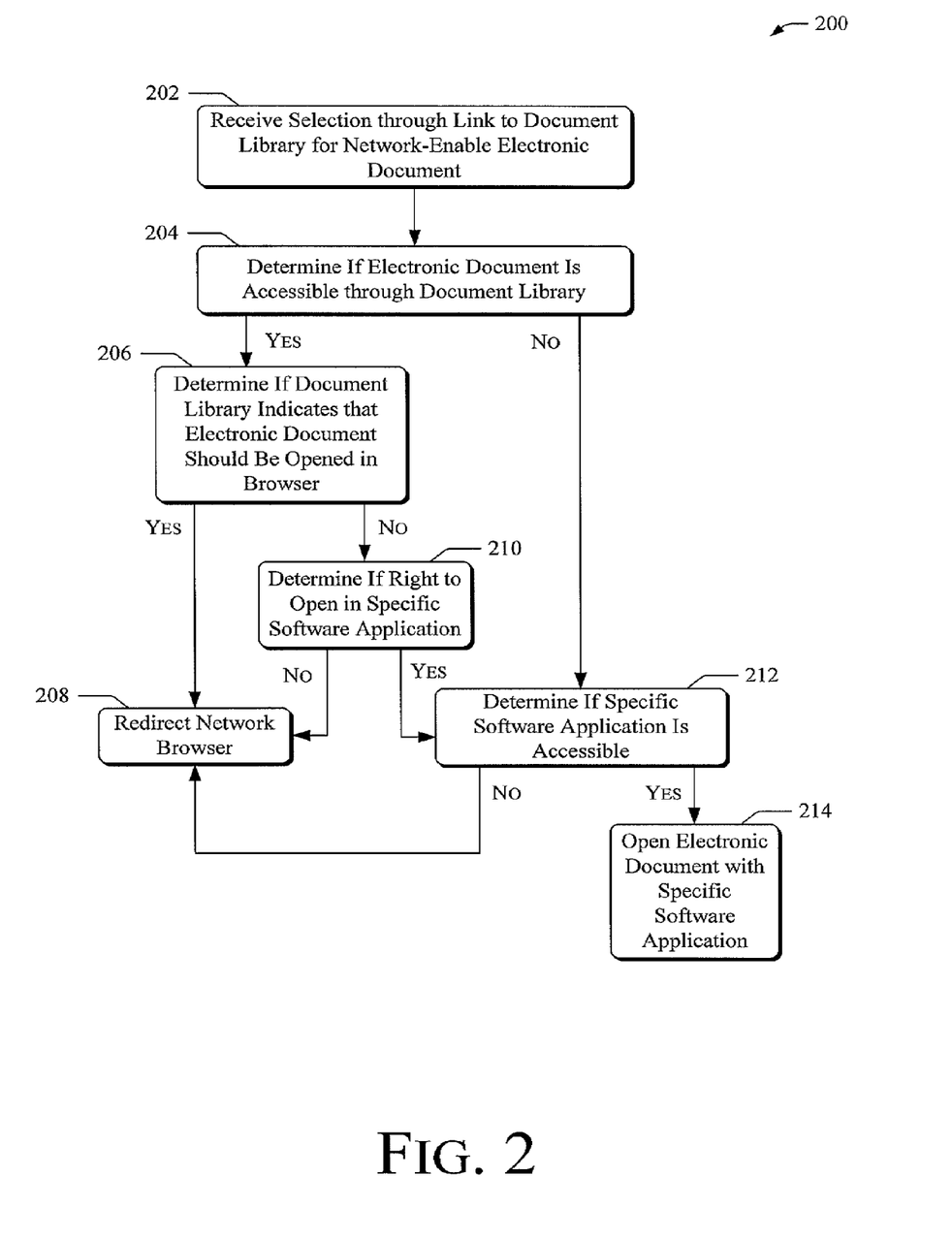
FIG. 2 is an exemplary process illustrating some ways in which the tools open a network-enabled electronic document in either a specific software application associated with the electronic document or a network browser when the electronic document is selected with a link in a document library.

FIG. 2 is an exemplary process 200 illustrating some ways in which the tools open a network-enabled electronic document selected with a link in a document library. The process is illustrated as a series of blocks representing individual operations or acts performed by elements of operating environment 100 of FIG. 1, such as detection module 110 and request handler 124. This and other processes disclosed herein may be implemented in any suitable hardware, software, firmware, or combination thereof, in the case of software and firmware, these processes represent a set of operations implemented as computer-executable instructions stored in computer-readable media and executable by one or more processors.

Block 202 receives a selection through a link to a document library for a network-enabled electronic document. A user, for instance, may click on an icon (e.g., a button graphic) associated with, or text for, a universal resource locator (URL) to select the electronic document in the document library.

Block 204 determines whether the electronic document is accessible through the document library, such as by being on a shared enterprise server (e.g., a SharePoint™ server). If yes, the tools proceed to block 206. If no, the tools proceed to block 212.

Block 206 determines whether the document library has a previously selected or default setting indicating that the electronic document should be opened in the network browser regardless of whether or not the specific software application associated with the electronic document is accessible and of a compatible version. If yes (it does have a setting), the tools proceed to block 208. If no, the tools proceed to block 210.

Block 208 redirects the network browser to a page on which the electronic document may be opened. Here the tools redirect the network browser to a dynamic server-generated browser page that is capable of opening the electronic document. This dynamic server-generated browser page may be generated using asp, aspx, jsp, php, and cgi technologies, for example, which permit the document to be displayed as part of the dynamic server-generated browser page. Here the tools use a URL having the URL for the electronic document along with query parameters. These query parameters indicate whether the document library is set for the electronic document to be opened in the browser even if the specific software application is accessible. These query parameters may contain an encoded server-relative path to the electronic document's file and an encoded absolute path to the page that was used to open the file. The absolute path parameter may later be used by the network browser to navigate back to that page when the electronic document is closed.

Block 210 determines whether the user has a right to open the electronic document in the specific software application. The tools may determine this based on a security setting in the file for the electronic document, which may be referenced in the path of the request. If no, the tools proceed to block 208 and redirect the network browser. If yes, the tools proceed to block 212.

Block 212 determines if the specific software application associated with the network-enable electronic document is accessible and, in some cases, whether it is of a compatible version. Here block 212 determines whether or not a document loading module associated with the specific software application is installed (e.g., an ActiveX module) on the user's computing device. If yes, the tools proceed to block 214. If no, the tools proceed to block 208.

Block 214 opens the electronic document with the specific software application. Here the tools use the document loading module to open the electronic document in the specific software application. The document loading module may receive, as a parameter, the URL for the electronic document. With this parameter, the specific software application requests the file for the electronic document in such a way that the server can distinguish the request from a network browsers request. In one particular embodiment, the server distinguishes the request with a translate F HTTP header, receives the file, and opens the electronic document.

Selecting an Electronic Document with a Link in a Webpage, Email, or Document The following discussion describes exemplary ways in which the tools open a network-enabled electronic document in either a specific software application associated with the electronic document or a network browser responsive to the electronic document being selected with a link in a webpage, email, or document. This discussion refers to particular elements, such as elements of operating environment 100 of FIG. 1, though other elements and environments may be used.

When a user selects a link to open an electronic document through a webpage, email, document (e.g., a word-processing document), or the like, the tools determine whether or not a specific software application associated with the electronic document is accessible by the user's computing device (e.g., it is installed) and is of a version compatible with the electronic document.

If these are both true, the tools cause the specific software application to open the electronic document. If these are not both true, the tools cause the network browser to open the electronic document. To open the electronic document using the network browser, the tools cause the network browser to navigate to a page with appropriate query parameters sufficient to cause the browser to open the electronic document on that page.

The tools may behave in either of these manners regardless of whether the user is selecting a new or existing electronic document. When the user is done with the electronic document, the tools may return the user to the document library page or other page through which the user selected the link. An exemplary process performing some of the above actions is set forth immediately below.

Figure 3:
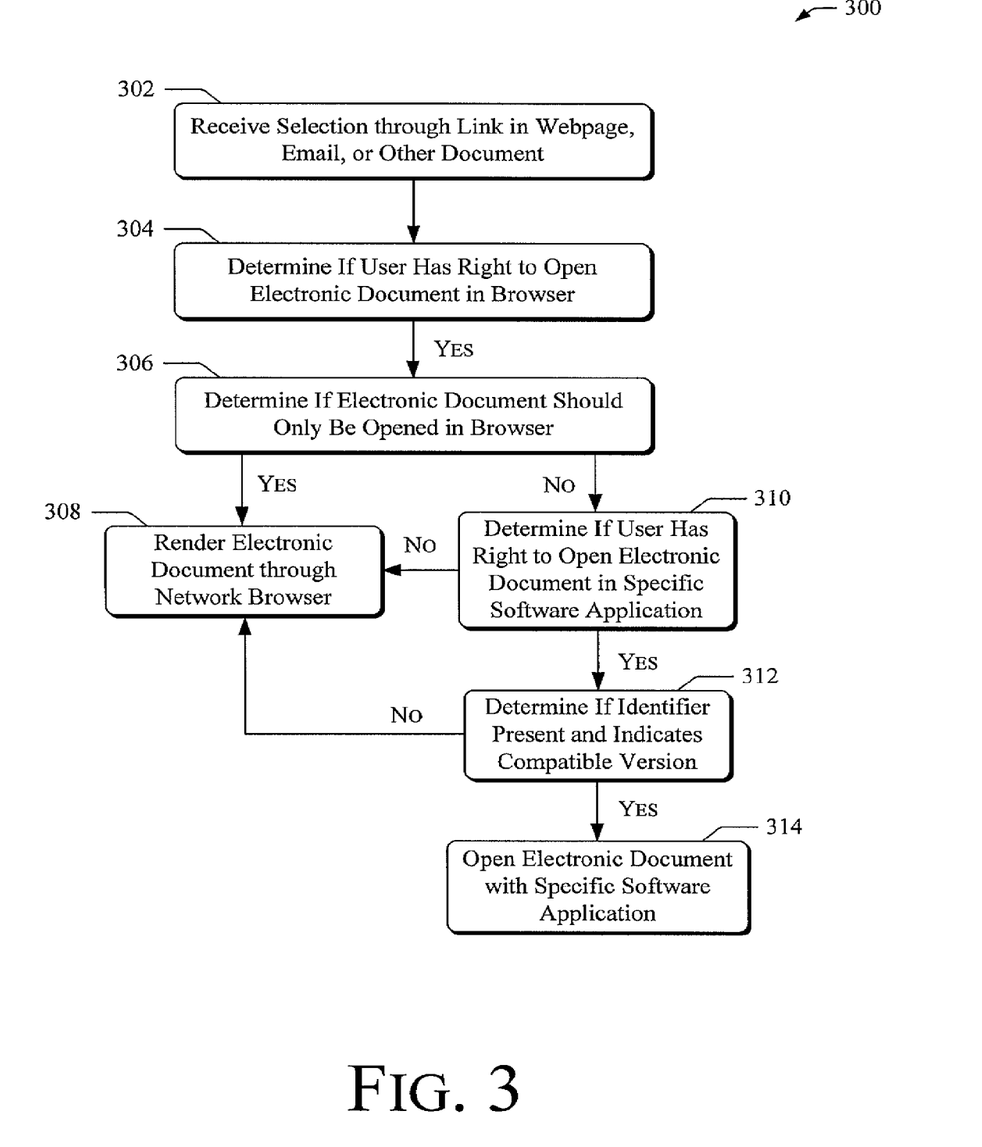
FIG. 3 is an exemplary process illustrating some ways in which the tools open an electronic document responsive to a user selecting the electronic document with a link in a webpage, an email, or another document.

FIG. 3 is an exemplary process 300 illustrating some ways in which the tools open an electronic document responsive to a user selecting the electronic document with a link in a webpage, an email, or another document. The process is illustrated as a series of blocks representing individual operations or acts performed by elements of operating environment 100 of FIG. 1, such as detection module 110 and request handler 124.

Block 302 receives a selection through a link in a webpage, email, or other document and for a network-enabled electronic document. A user, for instance, may click on a universal resource locator (URL) link in an email to select the electronic document.

Block 304 determines whether or not the user has a right to open the electronic document at least in the network browser. The tools may do so through information in the file for the electronic document, such as security settings and the identity of the user or machine through which the user selected the link. If block 304 determines that the user does not have this right, the tools may end the process and/or provide an error message (not shown).

Block 306 determines whether or not the electronic document should only be opened in the network browser. The tools may determine that the electronic document should be loaded in the network browser even if the user's computing device has access to the specific software application based on a default setting or a previously selected setting. If yes (it should be opened in the network browser), the tools proceed to block 308. If no, the tools proceed to block 310.

Block 308 renders the electronic document through the network browser. The tools may do so using a server having software tailored to the electronic document, such as an electronic-form-ready server for an electronic-form type of electronic document or a spreadsheet-ready server for an electronic document comprising spreadsheets.

Block 310 determines whether the user has a right to open the electronic document in the specific software application. The tools may determine this based on a security setting in the file for the electronic document, which may be referenced in the path of the request. If yes, the tools proceed to block 312. If no, the tools proceed to block 308 and render the electronic document.

Block 312 determines whether an identifier for the specific software application is present and, if so, whether it indicates a version equal to or greater than the electronic document's version. The tools may do so based on query parameters in the header. These query parameters may include those noted as part of process 200 above. If no, the tools proceed to block 308 and render the electronic document. If yes, the tools proceed to block 314.

Block 314 opens the electronic document with the specific software application. The tools may receive, as a parameter, the URL for the electronic document. The tools may then return the electronic document's content such that it will be opened by the specific software application. Or it may compute a URL for a redirect to the specific software application or append query parameters to the URL for the selected link. These parameters may include those noted as part of process 200. This URL or appended URL is used by the tools to launch the specific software application either with a 302 redirect to the appended URL or by passing the URL to the document loading module.

Determining where to Open Electronic Documents

The following discussion describes these and alternative ways in which the tools determine where to open a network-enabled electronic document. By way of example, this discussion refers to particular elements, such as elements of operating environment 100 of FIG. 1, processes 200 and 300, and flow diagram 500 of FIG. 5.

Figure 4:
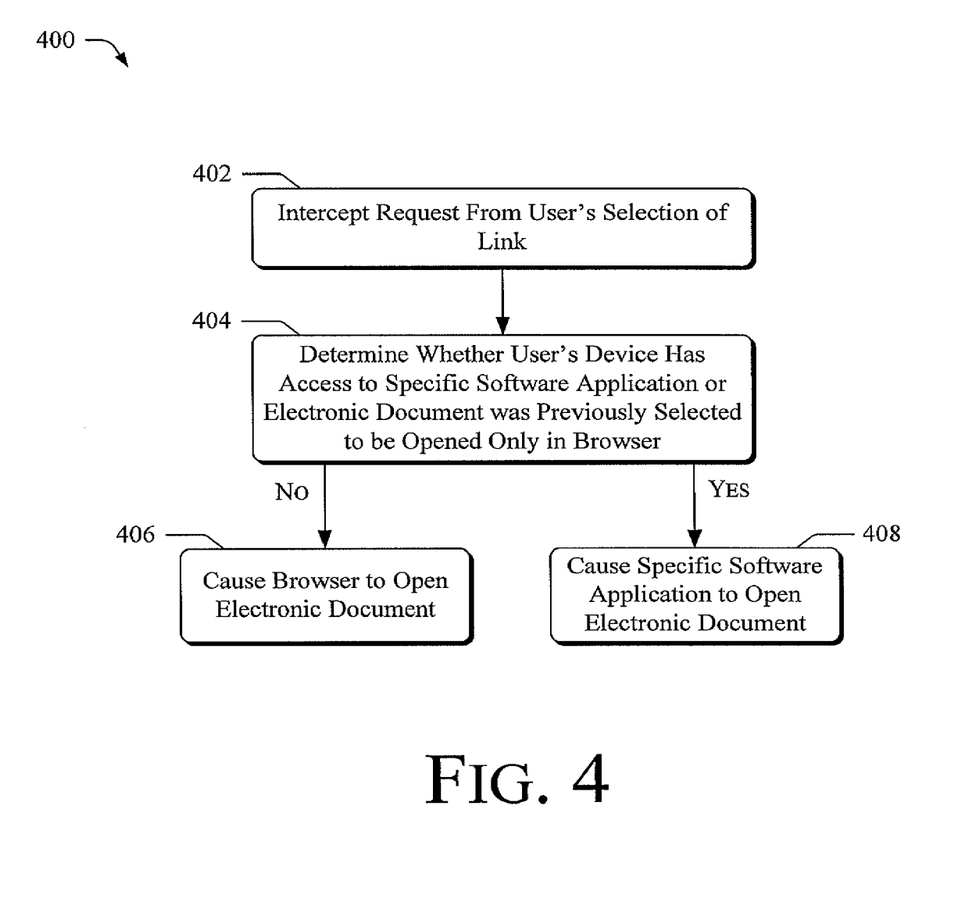
FIG. 4 is an exemplary process describing ways in which the tools determine whether to open in a network browser or a specific software application.

FIG. 4 is an exemplary process 400 illustrated as a series of blocks representing individual operations or acts performed by elements of operating environment 100 of FIG. 1, such as detection module 110 and request handler 124.

Block 402 intercepts a request generated by a user selecting a link to open an electronic document. The link may be to open an electronic document in a document library as set forth in process 200 or a link in a webpage, email, or other document as set forth in process 300. In some cases selection of this link, if it were not intercepted, would cause the specific software application to open the electronic document. In some others, if it were not intercepted, this selection would cause the network browser to open the electronic document.

This link may include information indicating what version or capabilities are needed in a specific software application associated with the requested electronic document to enable the functionality of the electronic document. Alternatively or conjunctively, the detection module may inspect the contents of the electronic document to determine the document's version or capabilities.

Figure 5:
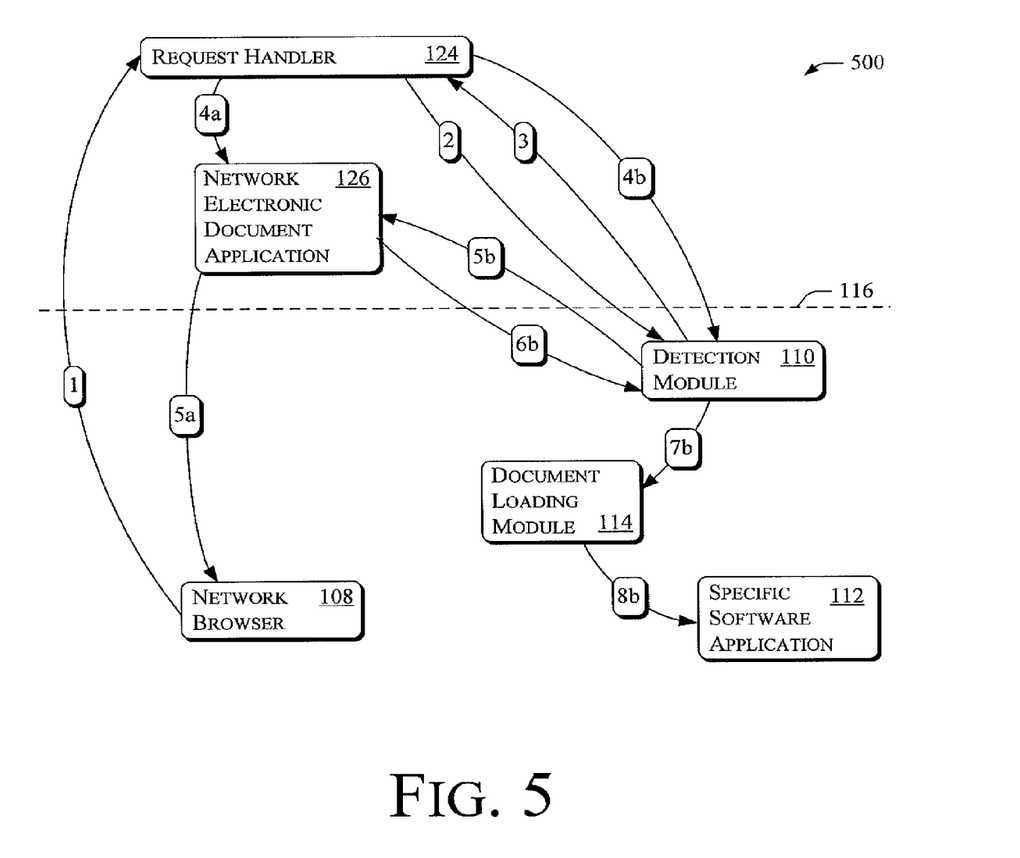
FIG. 5 shows an exemplary flow diagram with actions and/or communications between elements of FIG. 1.

FIG. 5 is an exemplary flow diagram showing actions and/or communications between elements of FIG. 1. Here the request generated by selection of the link is intercepted from network browser 108 (on client computing device 102) by request handler 124 over communications network 116. Communications over the communications network are shown with arrows over a dashed line. This interception is marked with arrow 1.

Block 404 determines whether or not the user's computing device has access to a specific software application associated with the requested electronic document or whether the electronic document was previously selected to be opened only in a network browser. Block 404 may also determine the capabilities of the specific software application and/or its version.

Here the request handler asks detection module 110 whether the user's computing device has access to the specific software application and for its version. The detection module receives this query for information from the request handler, shown at arrow 2. The detection module determines whether the user's client computing device has access to the specific software application (e.g., it is installed) and, if it does, the application's version. The detection module then provides this information, shown at arrow 3, which is received by the request handler. This communication between the request handler and the detection module may be indirect, such as through the network browser.

Block 404 may decide whether or not to make this determination based on the request having information indicating that the requested electronic document may possibly be opened using remote resources (e.g., network electronic document application 126) or local resources (e.g., specific software application 112). In some cases this information is a particular extension in a URL for the request, such as an ".xls" extension for a spreadsheet type of electronic document or an ".xml" extension for an electronic-form type of electronic document. In some other cases, this information is or is derived from meta-information promoted from the document to a filing system or document library.

Block 404 may also determine that the electronic document was previously selected to be opened only in the network browser based on having information indicating that the requested electronic document's URL comprises a particular parameter. This permits designers or other users of an electronic document to ensure that the electronic document is only opened in the network browser even if the user's client computing device has access to the specific software application associated with that electronic document.

Process 400 proceeds to block 406 if the user's client computing device does not have access (and/or an appropriate version or capabilities) to the specific software application or is previously set to be opened by the network browsers. Alternatively, an additional selection may be requested from the user, such as a dialog box asking whether or not the user wishes to open the electronic document in either the network browser or the specific software application (not shown). A user's selection to open the electronic document in the network browser may be determinative. Otherwise, the process proceeds to block 408.

Block 406 causes the electronic document to be opened in a network browser. If the request would have caused the electronic document to be opened in the specific software application—if it were not intercepted—the request handler alters the request effective to enable the network browser to handle the request. This dynamic alteration to the request causes data to be sent to the user's client computing device using a different format than were it not altered. Here the request handler alters the request and submits it to the network electronic document application effective to cause the network electronic document application to send data in a format acceptable for direct rendering in the network browser (e.g., HTML), rather than in the format used by the specific software application (e.g., the format corresponding to the physical file for the electronic document). This is shown in FIG. 5 at arrows 4a and 5a.

Block 408 causes a specific software application associated with the selected electronic document to open the electronic document. The request handler may instruct the detection module or document loading module 114 to request a physical file (e.g., a non-rendering file) for the electronic document in a format usable by the specific software application. This is shown at arrow 4b. The request handler may do so by dynamically altering the request from the user's selection and sending this altered request to the detection module or document loading module and telling it to make a request using this altered request. The request handler alters the user's request by appending query parameters to it (such as those noted in process 200 or 300 above).

Here the detection module receives these instructions and makes a request for a physical file. The detection module makes the request of the network electronic document application, though it may make the request of any source (local or remote) capable of supplying the physical file (arrow 5b). This physical file is effective to enable the specific software application to open the electronic document on the user's client computing device. In response, the network electronic document application provides the physical file to the detection module at arrow 6b.

The detection module receives the physical file and causes the document loading module to load the physical file and the specific software application effective to cause the specific software application to open the electronic document. This is shown at arrows 7b and 8b. The document loading module may know to cause the specific software application to load the physical file based on information provided in the physical file, such as its format being compatible with the specific software application but not with the network browser.

In cases where the link is selected by the user through the network browser, such as in a webpage, the tools may remain or return to that webpage. For instance, if a user selects a link in a webpage opened in the network browser, the tools may open the electronic document with the specific software application or within the webpage.

Each of the above acts, includes blocks of process 200, 300, and 400, may all be performed without user interaction other than the user's selection of a link to open an electronic document. This enables a user, with as little as one selection of one link, to open an electronic document in either a network browser or a specific software application, as appropriate. A user may not need, for example, to know whether his or her client computing device has access to the specific software application, that the specific software application is of an appropriate version or capabilities, or that the electronic document should be opened in the network browser even if the user's device has an appropriate specific software application installed.

CONCLUSION

The above-described systems, methods, and/or techniques enable a user to open a network-enabled electronic document in either a specific software application associated with the electronic document or a network browser. In some cases the user may do so through selection of a single link. Although the systems and methods have been described in language specific to structural features and/or methodological acts, it is to be understood that the systems and methods defined in the appended claims are not necessarily limited to the specific features or acts described. Rather, the specific features and acts are disclosed as exemplary forms of implementing the claimed systems and methods.

The invention claimed is:

1. A method implemented at least in part by a computing device comprising:
intercepting a request by a user to open an electronic document;
from a server, querying a client computing device to determine whether the client computing device has a specific software application capable of opening the electronic document;
receiving, on the server, a response indicating that the client computing device has the specific software application capable of opening the electronic document;
dynamically altering, on the server, the request to enable a network browser to open the electronic document instead of the specific software application;
submitting, to the client computing device, the altered request for opening the electronic document;
receiving, from the server, data in a format acceptable for rendering the electronic document in a web browser on the client computing device, wherein the data comprises a format different than physical files opened with the specific software application; and
opening the electronic document in the web browser on the client computing device,
wherein the request is altered by appending query parameters to the request,
wherein the query parameters indicate whether a document library on the client computing device is set for the electronic document to be opened in the network browser even if the specific software application is accessible on the client computing device,
wherein the query parameters contain an encoded server-relative path to the electronic document's file and an encoded absolute path to the page that was used to open the electronic document's file,
wherein the absolute path parameter is used by the network browser to navigate back to the page when the electronic document is closed,
wherein the intercepting the request is generated by the selection of a link and wherein the request, if it were not intercepted, would cause the specific software application to open the electronic document, and
wherein the acts of receiving and opening are performed without user interaction other than the user's selection of the link.

2. The method of claim 1, wherein the act of receiving comprises an indication from the user's computing device that the specific software application is installed on the client computing device.

3. The method of claim 1, further comprising:
requesting information from the user's computing device indicating whether the user's computing device has or does not have access to the specific software application;
receiving the information; and
sending, if the information indicates that the user's computing device has access to the specific software application, data for the electronic document in a format usable by the specific software application to the user's computing device.

4. The method of claim 1, wherein the link comprises a Universal Resource Locator (URL) for the electronic document within the document library.

5. The method of claim 1, wherein the link comprises a Universal Resource Locator (URL) selected from within a webpage, email, or other electronic document.

6. The method of claim 1, further comprising receiving the specific software application's version and the electronic document's version, and wherein the act of receiving comprises determining that the user's computing device does not have access to the specific software application if the specific software application's version is not compatible with the electronic document's version.

7. The method of claim 1, further comprising determining whether the electronic document was previously selected to be opened only in the network browser and, if the electronic document was so previously selected, causing the network browser to open the electronic document.

8. The method of claim 1, further comprising, if the link is selected from a webpage, and responsive to the electronic document being closed, presenting the webpage.

9. The method of claim 1, wherein the act of receiving comprises determining that the electronic document's file extension is for a type of electronic document capable of being opened in only one of the network browser or the specific software application.

10. A method implemented at least in part by a computing device comprising:
receiving, responsive to a user selecting a link for an electronic document, a query for information regarding whether the user's computing device has access to a specific version of a software application associated with the electronic document;
determining whether the user's computing device has access to the specific version of software application;
providing the information;
receiving, if the information indicates that the user's computing device has access to the specific version of the software application, instructions to make a request for data for the electronic document in a format usable by the specific version of the software application;
dynamically altering the request with one or more parameters, wherein the one or more parameters indicate whether a document library on the user's computing device is set for the electronic document to be opened in the a network browser even if the specific version of the software application is accessible on the user's computing device; and
directing the network browser on the user's computing device to a dynamic server-generated browser page that is capable of opening the electronic document, wherein the parameters contain an encoded server-relative path to the electronic document's file and an encoded absolute path to the page that was used to open the electronic document's file, wherein the absolute path parameter is used by the network browser to navigate back to the page when the electronic document is closed, wherein the act of providing the information comprises providing the version for the specific software application and the act of receiving instructions comprises receiving the instructions only if the information indicates that the specific software application's version is as new or newer than the electronic document's version, and wherein the acts of receiving the query, providing, receiving instructions, and making the request are performed without user interaction other than being responsive to the user selecting the link.

11. The method of claim 10, further comprising receiving the data and causing the specific version of software application to load the data effective to open the electronic document.

* * * * *